UNITED STATES PATENT OFFICE.

FRANCIS ARTHUR FREETH, OF SANDIWAY, AND HERBERT EDWIN COCKSEDGE, OF LONDON, ENGLAND.

MANUFACTURE OF AMMONIUM NITRATE.

1,301,047.　　　　　　　　Specification of Letters Patent.　　Patented Apr. 15, 1919.

No Drawing.　　Application filed September 16, 1918.　Serial No. 254,339.

*To all whom it may concern:*

Be it known that we, FRANCIS ARTHUR FREETH and HERBERT EDWIN COCKSEDGE, subjects of the King of Great Britain, residing at Sandiway, Cheshire, England, and London, England, respectively, have invented a new and useful Process for the Manufacture of Ammonium Nitrate, of which the following is a specification.

In our previous Patent No. 1051097 dated January 21st 1913 we described a process for obtaining pure ammonium nitrate and sodium sulfate from ammonium sulfate and sodium nitrate, the process being a cyclic one.

When however it was tried on a large scale it was found that, under the conditions therein described, instead of sodium sulfate a double salt having the composition $Na_2SO_4.NaNO_3.H_2O$ was deposited, and that the cycle described could not be carried out.

After long experiment we have now worked out a process in which the formation of this double salt is avoided and sodium sulfate free from admixture of double salt is produced.

Our process consists in the preparation of practically pure ammonium nitrate and sodium sulfate directly by the addition of ammonium sulfate and sodium nitrate to a solution which we subsequently describe, and under conditions subsequently specified this solution being continuously reformed in the course of the process.

The process depends upon the fact, hitherto unknown, that when a solution saturated or practically saturated with respect to ammonium nitrate, sodium nitrate, and sodium sulfate at any given temperature, but which is not in contact with any of these salts in the solid state at that temperature, is diluted with sufficient water to enable the sodium salts to remain in solution at the lower temperature to which the solution thus diluted is to be cooled, then on thus cooling, ammonium nitrate crystallizes out, which after washing with water or a solution of ammonium nitrate is pure or practically pure.

The solution from which the crystallized ammonium nitrate has been separated is then concentrated by evaporation sufficiently to remove from it a quantity of water equivalent to that which has been added, and ammonium sulfate and sodium nitrate equivalent in quantity to the ammonium nitrate crystallized out previously are added to this concentrated solution, the whole being maintained at a temperature not lower than that at which the original solution was saturated with respect to ammonium nitrate, sodium nitrate and sodium sulfate before being diluted. Sodium sulfate is then precipitated in quantity equivalent to the ammonium sulfate and sodium nitrate added. This sodium sulfate is separated from the solution and after washing is practically pure. The solution then remaining is similar in quantity and composition to the original solution from which, after dilution and cooling, ammonium nitrate was crystallized out, that is, it is a solution saturated at the same, or approximately the same temperature with respect to ammonium nitrate, sodium sulfate, and sodium nitrate, and, when diluted with water and subjected to crystallization as previously described, it again separates out ammonium nitrate, and the process can thus be carried out in continuously repeated cycles.

The process of this invention is illustrated in the following example.

*Example.*

Starting with a solution having the following composition by weight, ammonium nitrate 50.0, sodium nitrate 17.0, sodium sulfate 5.1, water 27.9, there is added per 100 parts by weight of such solution 16.7 parts of ammonium sulfate and 21.4 parts of sodium nitrate: 12.1 parts of water are evaporated before, during or after such addition of sodium nitrate and ammonium sulfate, during these operations the temperature must not fall below 60° C. and at the conclusion of the reaction the precipitate of sodium sulfate is separated from the solution at or slightly above a temperature of 60° C., and to the solution remaining there is added 11.15 parts of water per 100 parts by weight of such solution.

The solution after such dilution is cooled to 20° C., when it deposits a large precipitate of ammonium nitrate, which after removal of adherent mother liquor is pure or practically pure, the mother liquor remaining has the same composition as the original liquor with which the example commenced, and is ready for a fresh and precisely similar cycle of operations.

The temperature of 60° is given by way of example. The temperature has to be above 55° C. in order to fulfil the hereinbefore mentioned conditions of success, namely, that the solution shall be saturated with the three salts, ammonium nitrate, sodium nitrate and sodium sulfate, and further that formation of the double salt shall be avoided.

We declare that what we claim is:—

1. The process for manufacturing pure or nearly pure ammonium nitrate which consists in allowing such quantities of ammonium sulfate, sodium nitrate and water, or such quantities of ammonium sulfate, sodium nitrate, and mother liquors from previous operations containing ammonium nitrate, sodium nitrate, and sodium sulfate, to react together at such a temperature as will yield when the reaction is finished a precipitate of sodium sulfate and a mother liquor saturated or practically saturated with ammonium nitrate, sodium nitrate, and sodium sulfate, separating the precipitated sodium sulfate at or slightly above such temperature of saturation, adding water to the mother liquor remaining after such separation in quantity sufficient to enable the sodium salts to remain in solution at the lower temperature to which the solution thus diluted is to be cooled, cooling to such lower temperature, separating the ammonium nitrate deposited at such temperature, and washing it to remove adherent mother liquor, thereby making it pure or practically pure; evaporating the mother liquor remaining to an extent sufficient to remove from it a quantity of water equivalent to that which has been added, adding to such concentrated liquor quantities of ammonium sulfate and sodium nitrate equivalent to the ammonium nitrate previously removed and repeating and continuing the operations of separation of sodium sulfate, dilution, cooling, etc., which again result in the production of pure ammonium nitrate and sodium sulfate, and repeating the cycle of operations indefinitely.

2. The process of obtaining pure ammonium nitrate which consists in producing a solution saturated with respect to ammonium nitrate, sodium nitrate and sodium sulfate at a temperature not less than that sufficient to prevent the formation of the double salt $NaNO_3.Na_2SO_4.1H_2O$, diluting this solution with sufficient water to enable the sodium salts to remain in solution at a given lower temperature, cooling to that temperature and separating the ammonium nitrate which crystallizes out when the solution is thus cooled.

In witness whereof, we have hereunto signed our names this 26th day of August, 1918, in the presence of two subscribing witnesses.

FRANCIS ARTHUR FREETH.
HERBERT EDWIN COCKSEDGE.

Witnesses:
H. P. SHOOBRIDG,
J. McLACHLAN.